(12) United States Patent
Merlau et al.

(10) Patent No.: US 12,421,826 B1
(45) Date of Patent: Sep. 23, 2025

(54) SEALING DEVICE (71) Applicant: Schlumberger Technology Corporation, Sugar Land, TX (US)

(72) Inventors: David Merlau, Rosharon, TX (US); Gareth Yen Ket Chin, Rosharon, TX (US); Brian John Bethscheider, Rosharon, TX (US); Marius Smarandache, Rosharon, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/821,594

(22) Filed: Aug. 30, 2024

(51) Int. Cl.
*E21B 34/06* (2006.01)
*F16K 11/07* (2006.01)

(52) U.S. Cl.
CPC .......... *E21B 34/06* (2013.01); *F16K 11/0712* (2013.01)

(58) Field of Classification Search
CPC ... E21B 33/1208; E21B 34/96; F16K 11/0712
See application file for complete search history.

(56) References Cited

U.S. PATENT DOCUMENTS

| 4,638,578 | A | 1/1987 | Eiteljorg, II |
| 4,796,699 | A | 1/1989 | Upchurch |
| 5,074,792 | A | 12/1991 | Bernadat |
| 5,546,436 | A | 8/1996 | Jones et al. |
| 5,956,830 | A | 9/1999 | Imbus et al. |
| 6,131,913 | A | 10/2000 | Auber |
| 6,267,382 | B1 | 7/2001 | Auber |
| 6,406,028 | B1 * | 6/2002 | Kannan ............... E21B 33/1208 |
| | | | 277/342 |
| 6,408,497 | B1 | 6/2002 | Whetstone |
| 6,494,265 | B2 | 12/2002 | Wilson |
| 7,007,476 | B2 | 3/2006 | Mains et al. |
| 7,063,329 | B2 | 6/2006 | Anderson et al. |
| 7,874,051 | B2 | 1/2011 | Allen |
| 8,428,282 | B2 | 4/2013 | Fideler |
| 8,443,907 | B2 * | 5/2013 | Mickey ................. E21B 27/02 |
| | | | 277/645 |
| 9,086,157 | B2 * | 7/2015 | Rowe ........................ F16K 1/36 |
| 9,334,736 | B2 | 5/2016 | Wheeler et al. |
| 10,072,776 | B2 | 9/2018 | Kocourek |
| 10,317,270 | B2 | 6/2019 | Salser et al. |
| 11,079,191 | B1 | 8/2021 | Sugg |
| 11,226,045 | B1 | 1/2022 | Richard et al. |
| 11,353,116 | B2 | 6/2022 | Milroy |

(Continued)

FOREIGN PATENT DOCUMENTS

| AU | 2006291397 B2 | 5/2010 |
| CN | 101291048 A | 10/2008 |

(Continued)

*Primary Examiner* — Aaron L Lembo
(74) *Attorney, Agent, or Firm* — Jeffrey D. Frantz (57) ABSTRACT

A sealing device for sealing an interface between a first surface and a second surface includes a primary sealing element for forming a primary seal at the interface and a carrier body that is slidable with respect to the interface to engage the primary sealing element. A carrier sealing element is positioned on the carrier body, and is configured to seal the interface with a secondary seal. The carrier body is slidable to engage the primary sealing element based on the secondary seal sealing the interface.

19 Claims, 7 Drawing Sheets

(56) References Cited

U.S. PATENT DOCUMENTS

| | | |
|---|---|---|
| 11,655,924 B2 | 5/2023 | Ramaswamy |
| 11,993,978 B2 | 5/2024 | Hansen et al. |
| 12,104,459 B2 * | 10/2024 | Qin ................ F16J 15/3284 |
| 2002/0020967 A1 | 2/2002 | Auber |
| 2005/0109502 A1 | 5/2005 | Buc Slay |
| 2005/0161212 A1 * | 7/2005 | Leismer ................ E21B 34/00 166/179 |
| 2006/0021676 A1 | 2/2006 | McDaniel et al. |
| 2006/0071473 A1 | 4/2006 | Torres |
| 2006/0145477 A1 | 7/2006 | Reynolds, Jr. |
| 2008/0191474 A1 * | 8/2008 | Kotz ................ F16J 15/062 285/276 |
| 2008/0265517 A1 | 10/2008 | Jennings |
| 2010/0052319 A1 | 3/2010 | Benzie et al. |
| 2011/0084483 A1 | 4/2011 | Nunez |
| 2011/0162463 A1 | 7/2011 | Allen |
| 2012/0205091 A1 * | 8/2012 | Turley ................ E21B 43/103 166/77.53 |
| 2013/0033139 A1 | 2/2013 | Tones et al. |
| 2014/0284046 A1 | 9/2014 | Bramwell |
| 2015/0047786 A1 | 2/2015 | Lubomirsky et al. |
| 2017/0159177 A1 | 6/2017 | Monsma et al. |
| 2018/0010697 A1 | 1/2018 | Parks, Jr. |
| 2018/0224036 A1 | 8/2018 | Ramaswamy |
| 2019/0193237 A1 | 6/2019 | Motoshima |
| 2020/0189811 A1 | 6/2020 | Hughes et al. |
| 2022/0221073 A1 | 7/2022 | Favreau |
| 2023/0253189 A1 | 8/2023 | Han et al. |
| 2023/0270935 A1 | 8/2023 | Lyness et al. |
| 2023/0332614 A1 | 10/2023 | Reimann et al. |
| 2025/0129687 A1 * | 4/2025 | Slup ................ E21B 33/1293 |

FOREIGN PATENT DOCUMENTS

| | | |
|---|---|---|
| CN | 104303294 A | 1/2015 |
| CN | 110469731 A | 11/2019 |
| EP | 698190 B1 | 1/1999 |
| EP | 2521898 B1 | 7/2011 |
| EP | 2698573 B1 | 9/2015 |
| EP | 2846139 B1 | 4/2016 |
| EP | 2521899 B1 | 6/2018 |
| EP | 2998618 B1 | 5/2020 |
| EP | 3702622 A1 | 9/2020 |
| GB | 1042506 A | 9/1966 |
| GB | 1485381 A | 9/1977 |
| GB | 2467066 B | 4/2012 |
| WO | 2011049691 A2 | 4/2011 |
| WO | 2012099748 A1 | 7/2012 |
| WO | 2014100114 A1 | 6/2014 |
| WO | 2019177904 A1 | 9/2019 |
| WO | 2023114336 A1 | 6/2023 |
| WO | 2023163741 A1 | 8/2023 |
| WO | 2023172389 A1 | 9/2023 |
| WO | 2024025694 A1 | 2/2024 |

* cited by examiner

SEALING DEVICE

BACKGROUND OF THE DISCLOSURE

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be formed in earthen formations using earth-boring tools such as drill bits for drilling wellbores and reamers for enlarging the diameters of wellbores.

Downhole tools may be implemented within a wellbore which may be subjected to various downhole fluids (e.g., liquids and/or gasses) at various pressures and flow rates. In many cases, downhole tools may have portions or volumes that need to be sealed from downhole fluids to facilitate the operation of the tools, protect various components from the downhole fluids, direct the flow of the downhole fluids, etc. Thus, improved sealing devices for providing effective and reliable seals may be advantageous.

SUMMARY

In some embodiments, a sealing device for sealing an interface between a first surface and a second surface includes a primary sealing element for forming a primary seal at the interface. The sealing device includes a carrier body that is slidable with respect to the interface to engage the primary sealing element. A carrier sealing element is positioned on the carrier body and is configured to seal the interface with a secondary seal. The carrier body is slidable to engaging the primary sealing element based on the secondary seal sealing the interface.

In some embodiments, a sealing device for sealing a sealing interface between a first surface and a second surface includes a primary sealing element and a carrier body that is slidable with respect to the sealing interface to engage the primary sealing element and to energize the primary sealing element against the sealing interface to form a primary seal. A carrier sealing element is positioned on the carrier body and is configured to seal the sealing interface with a secondary seal. The sealing device is configured to transition between the sealing interface and an open interface of the first and second surfaces.

In some embodiments, a downhole valve includes an outer cylindrical body and an inner cylindrical body positioned within the outer cylindrical body with an interface therebetween. The downhole valve includes a sealing device for sealing the interface. The sealing device includes a V-ring seal stack and a carrier ring that is slidable with respect to the interface to engage the V-ring seal stack and to activate the V-ring seal stack against the interface and form a primary seal. The sealing device further includes a carrier sealing element disposed on the carrier ring and configured to seal the interface with a secondary seal. The carrier ring is slidable based on the secondary seal sealing the interface, and the inner cylindrical body is slidable with respect to the outer cylindrical body to expose the sealing device to a flow port for flowing a downhole fluid through the flow port.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 2-1, 2-2, and 2-3 illustrate side cross-section views of a sealing device, according to at least one embodiment of the present disclosure;

FIGS. 3-1, 3-2, and 3-3 illustrate side cross-section views of a sealing device, according to at least one embodiment of the present disclosure;

FIG. 4-1 illustrates a side cross-section view of a sealing device, according to at least one embodiment of the present disclosure;

FIG. 4-2 illustrates a side cross-section view of a carrier body, according to at least one embodiment of the present disclosure;

FIG. 4-3 illustrates a side cross-section view of a carrier body, according to at least one embodiment of the present disclosure;

FIGS. 5-1 and 5-2 illustrate side cross-section views of a sealing device, according to at least one embodiment of the present disclosure;

FIG. 5-3 illustrates a side-cross section view of a sealing device, according to at least one embodiment of the present disclosure; and FIGS. 6-1, 6-2, and 6-3 illustrate side cross-section views of a sealing device, according to at least one embodiment of the present disclosure.

DETAILED DESCRIPTION

This disclosure generally relates to a sealing device for providing a fluid and pressure seal for sealing an interface between two surfaces. The sealing device may be implemented to form a seal for a downhole tool or component. For instance, the sealing device may be implemented to provide a seal within a valve, such as between a cylinder and a mandrel of a spool valve. However, while the sealing device may be specifically described herein with respect to a valve implementation and/or with respect to a round or cylindrical configuration, the techniques described herein may be implemented to provide sealing of any interface between surfaces, such as flat or planar interfaces, or interfaces having cross-sectional shapes other than round.

The sealing device includes a primary sealing element for providing a primary seal at the interface. The primary sealing element may be a type of sealing element, such as a V-ring seal, that requires energizing or activating to sufficiently engage the interface to form the primary seal. In some cases, these types of sealing elements may energize and/or activate in the presence of elevated fluid pressures and/or flow rates acting on the sealing elements. As such, these types of sealing elements may tend to delay in providing pressure and fluid seals, may leak, and/or may fail to seal when exposed to insufficient pressures and/or flow rates, and/or when fluid pressures and/or flow rates are not introduced with a sufficiently fast ramp up period.

The sealing device includes a carrier body having a carrier sealing element positioned thereon. The carrier sealing element may be a type of sealing element, such as an O-ring seal, that exhibits substantial initial contact pressure at the interface so as to provide a secondary pressure and fluid seal. For example, in some cases, the carrier sealing element may not require energization or activation in order to seal and/or may be configured to energize and/or activate on its own sufficient to begin sealing. This secondary seal may operate to seal the interface by way of the carrier body. In this way, the pressure at the interface as sealed by the carrier sealing element may act on the carrier body and may cause the carrier body to slide, at least somewhat, with respect to the interface and with respect to the primary sealing element. The carrier body may accordingly engage the primary sealing element and may energize or activate the primary sealing element. For instance, the carrier body may have a sealing profile that is complementary to the shape of the primary sealing element, and which may cause the primary sealing element to deflect or deform toward the interface to increase the contact pressure of the primary sealing element at the interface and therefore form the primary seal. In this way, the sealing device may facilitate forming a strong and reliable primary seal with the primary sealing element by way of the carrier body and by way of the secondary seal, notwithstanding pressures and/or flow rates that may not be sufficient to energize the primary sealing element directly.

In some cases, the sealing device may be exposed to an open interface, such as a flow port within a valve. For example, the sealing device may be configured to transition in and out of the open interface, for example, for sealing and opening a valve one or more times. Fluid flow through the open interface may tend to exert pressures and/or forces that may tend to extract, draw out, extricate, or otherwise remove the secondary sealing element from the sealing device, such as by forcing the secondary sealing element from the sealing device and out the open interface (e.g., port). The carrier body may be made of a material having a strength and rigidity so as to withstand the pressures and forces at the open interface such that the carrier body may not be extracted or removed through the flow port via the fluid flow. Additionally, the carrier sealing element may be disposed on and/or in the carrier body such that the carrier sealing element is maintained in the sealing device and is not extricated from the sealing device through the flow port via the fluid flow. For instance, the carrier sealing element may be disposed within a seal groove for positioning and maintaining the carrier sealing element in the carrier body.

In this way, the sealing device of the present disclosure may be implemented to provide an effective and reliable seal of an interface via a secondary seal that may function to energize primary sealing elements for providing a primary seal of the interface. Additionally, such a device may be configured to withstand fluid flows when exposed to an open interface, where a corresponding mating surface may not be present to retain sealing elements in place in the sealing device.

Figure 1:
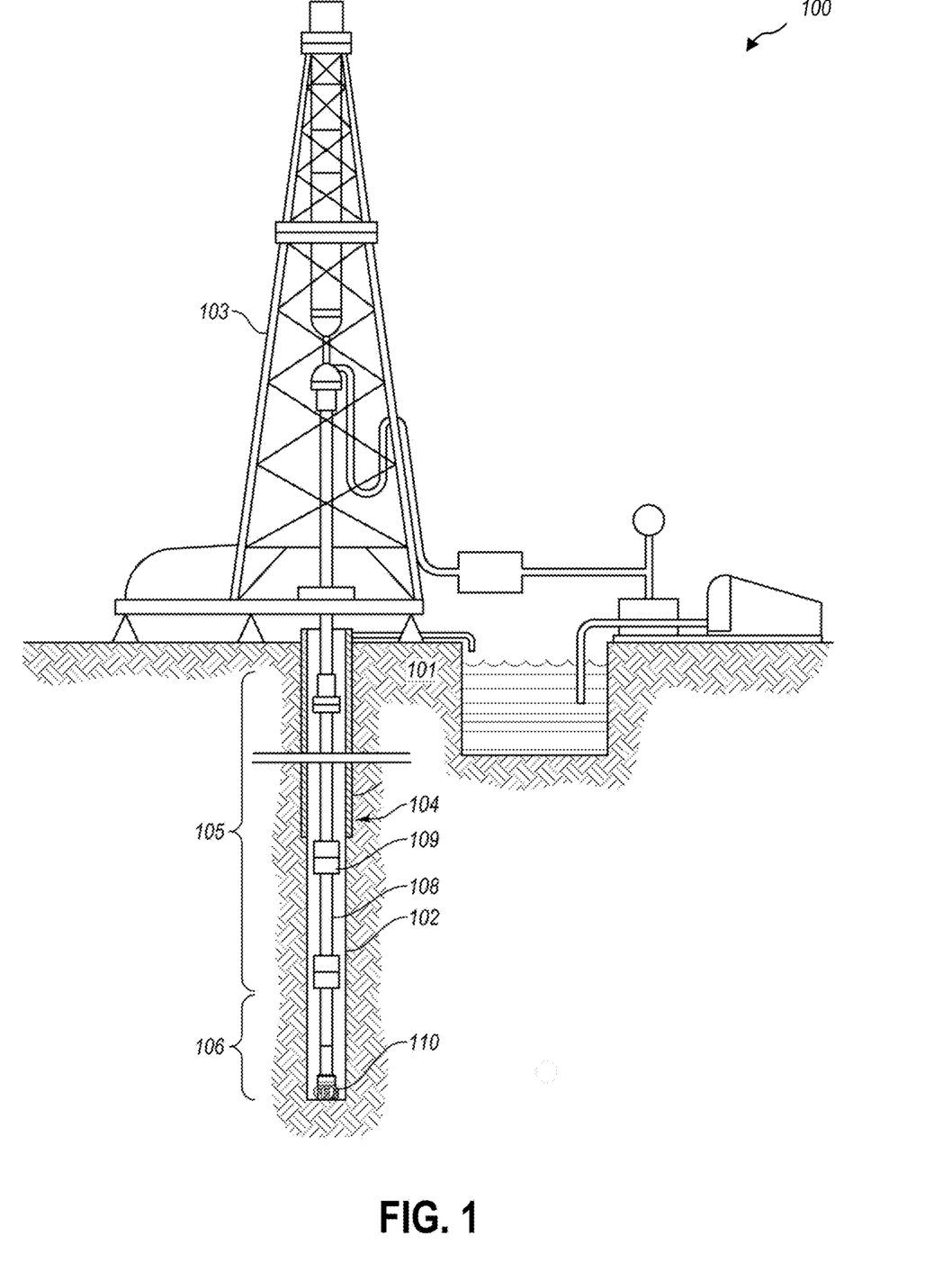
FIG. 1 is an example of a downhole system, according to at least one embodiment of the present disclosure.

Additional details will now be provided regarding systems described herein in relation to illustrative figures portraying example implementations. For example, FIG. 1 shows one example of a downhole system 100 for drilling an earth formation 101 to form a wellbore 102. The downhole system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of the drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 further includes additional downhole drilling tools and/or components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110, other downhole drilling tools, or other components. An example BHA 106 may include additional or other downhole drilling tools or components (e.g., coupled between the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing.

In general, the downhole system 100 may include other downhole drilling tools, components, and accessories such as special valves (e.g., kelly cocks, blowout preventers, and safety valves). Additional components included in the downhole system 100 may be considered a part of the drilling tool assembly 104, the drill string 105, or a part of the BHA 106, depending on their locations in the downhole system 100.

The downhole system 100 may be implemented with any of a variety of downhole tools, for example, in addition to or as an alternative to the bit 110. These downhole tools may be implemented during drilling activities, completion activities, evaluation activities, production activities, or as part of any other operation with respect to the wellbore 102 formed by the downhole system 100. In many cases, downhole tools may be exposed to fluids, such as downhole gasses and liquids. The downhole tools may be equipped with a sealing device as described herein for sealing fluid pressures and/or flow rates from various portions of the downhole tools. In a particular example, a downhole tool may be or may include a valve for directing the flow of a downhole fluid. The valve may be equipped with the sealing device for sealing various portions of the valve and for directing (or preventing) the flow of downhole fluid in a desired path. The sealing device as described herein may be implemented in any other downhole tool, for example, for sealing an interface of surfaces of the downhole fluid from fluid pressures and/or flow rates.

Figure 21:
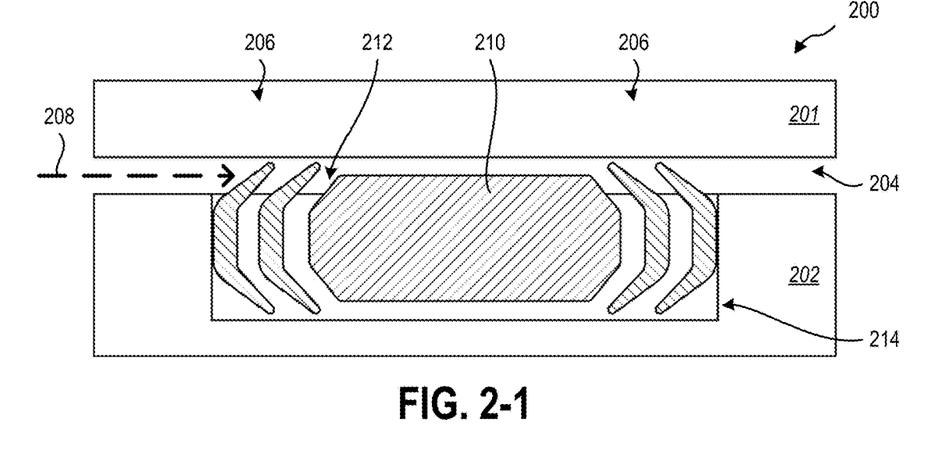
Figure 22:
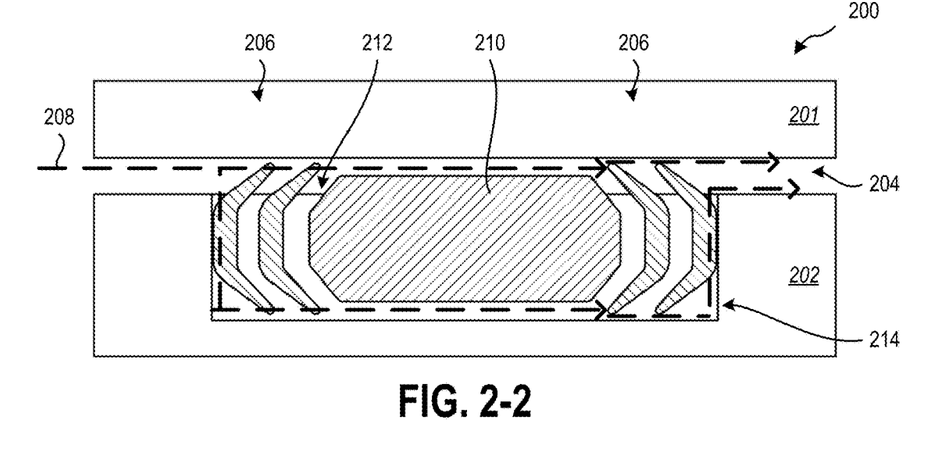
Figure 23:
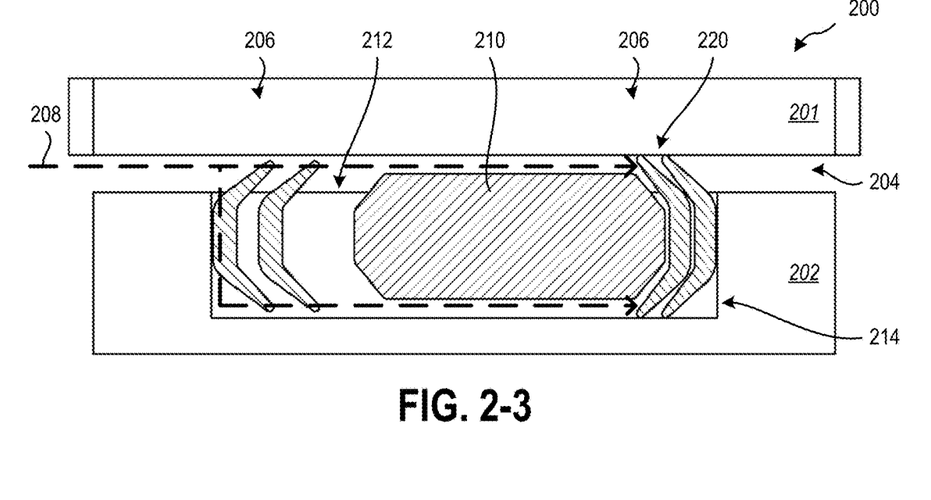

FIGS. 2-1, 2-2, and 2-3 illustrate side cross-section views of a sealing device 200 according to at least one embodiment of the present disclosure. The sealing device 200 may be implemented to seal an interface 204 between a first surface 201 and a second surface 202. The first surface 201 and the second surface 202 may be surfaces within a downhole valve, such as a cylinder and a mandrel of a spool valve, or may be any other surfaces having an interface to be sealed in any other downhole tool. For instance, the elements depicted in FIGS. 2-1, 2-2, and 2-3 may be cross-section representations of cylindrical-shaped or ring-shaped elements. The sealing device 200 may also be applicable in implementations that are not cylindrical or round, such as planar implementations. Indeed, the sealing device 200 may be implemented in any application in which it is necessary to provide a seal between two surface.

The sealing device 200 may be positioned within a pocket 214 of the first surface 201 (or the second surface 202), such as a recess, groove, hole, opening, or other void for positioning and maintaining the sealing device 200. The sealing device 200 may extend, at least somewhat, from the pocket 214 such that the sealing device 200 may engage both the first surface 201 and the second surface 202 (e.g., at a bottom of the pocket 214) in order to seal the interface 204. As shown and described herein, the sealing device 200 (e.g., or components of the sealing device 200) may be configured to translate or slide within the pocket 214 based on a flow and direction of a fluid flow in the interface 204. The movement of the sealing device 200 within the pocket 214 may be shown as somewhat exaggerated for illustrative purposes. In some cases, the sealing device 200 is not positioned within a pocket, but may be positioned and maintained between the surfaces by any suitable structure for supporting the sealing device 200 such that the sealing device 200 may function and contact both surface as described herein.

A fluid 208 (e.g., gas or liquid) may be introduced into the interface 204, and the sealing device 200 may be implemented to seal the interface 204 and prevent the flow of the fluid 208 through the interface and past the sealing device 200. In at least one embodiment, the interface 204 is sealed by a means for forming a primary seal (e.g., one or more primary sealing elements 206). For example, the sealing device 200 includes one or more primary sealing elements 206, for example, for engaging the first surface 201 and second surface 202 and for forming the primary seal 220 in order to seal the interface 204 and prevent the fluid 208 from flowing between the surface.

The sealing device 200 may include a plurality of primary sealing elements 206, with at least one primary sealing element 206 situated on one or both sides of the sealing device 200. For instance, the primary sealing element(s) 206 may be unidirectional and may be situated on one or opposite sides of the sealing device 200 and in opposite orientations in order to provide sealing for the fluid 208 flowing in either direction. In some embodiments, the sealing device 200 includes the primary sealing element 206 on only one side of the sealing device 200, for example, for providing fluid sealing in only one direction. In some cases, the sealing device 200 includes a plurality of primary sealing elements 206 (e.g., on one or both sides of the sealing device 200). For instance, the primary sealing element 206 may comprise a stack of several sealing elements for providing increased sealing functionality, redundancy, reliability, etc.

In some cases, the sealing device 200 includes a carrier body 210. The carrier body 210 may facilitate positioning and/or maintaining the primary sealing element(s) 206 of the sealing device 200. For example, the carrier body 210 may separate the primary sealing elements 206 on either side of the sealing device 200. To elaborate, the pressure exerted on the left of the sealing device 200 (as oriented in this illustrative example) from the flow of the fluid 208 may tend to force the left primary sealing element 206 and the carrier body 210 toward the right primary sealing element 206. The carrier body 210 may separate the primary sealing elements 206 and prevent them from being forced into each other and becoming smashed, deformed, damaged, etc. For instance, the carrier body 210 may have a sealing profile 212 that is complementary to a shape and/or form of the primary sealing elements 206 and that may facilitate maintaining the shape and/or form of the primary sealing elements 206.

In some embodiments, the primary sealing element 206 is a sealing element of a type that requires some energization or activation to fully (or more fully) engage or seal the interface 204. For example, the primary sealing element 206 may be made of a material that is sufficiently rigid and/or strong so as to withstand the fluid pressures and/or flow rates in which it is implemented without becoming damaged or failing. For instance, the primary sealing element 206 may be made of a rubber, elastomer, thermoplastic, or other suitable material. The primary sealing element 206 may be reinforce with fabric or metal reinforcement.

The material properties of the primary sealing element 206, however, may contribute to the behavior of the primary sealing element 206 requiring energization or activation to become fully compliant and/or to provide a full or complete seal. For example, the primary sealing element 206 may initially reside in an initial state or initial condition (e.g., as shown in FIG. 2-1) in which the primary sealing element 206 does not provide a sufficient, increased, or full sealing effect. For example, the primary sealing element 206 may initially not contact the first surface 201 and/or second surface 202. In another example, the primary sealing element 206 may contact the first surface 201 and/or second surface 202 but may do so with a contact pressure that is insufficient to provide a full, effective, and/or reliable seal of the interface 204. When acted on by the pressure and/or flow rate of the fluid 208, the primary sealing element 206 may deform or deflect to an energized state or energized condition (e.g., as shown in FIG. 2-3). In some examples, the energized state is a state of the primary sealing element 206 which provides a complete and/or fully energized seal. In some cases, the energized state may be a state in which the primary sealing element 206 is more energized or more sealed than an initial state, but may not be fully sealed or fully energized, such that some fluid and/or pressure may flow past the primary sealing element 206. In this way the energized state may represent a condition of the primary sealing element 206 at any level or extent of energization and/or sealing, for example, above that of the initial state. For example, the mass of the fluid 208, given the pressure and/or flow rate of the fluid 208, acting on the primary sealing element 206 may operate to increase the contact pressure of the primary sealing element 206, for example, by deflecting or wedging the primary sealing element 206 further into the first surface 201 and/or second surface 202. In some cases, the primary sealing element 206 is a V-ring seal. The primary sealing element 206 may be any other type of sealing element which may exhibit a variable or changing engagement with the interface 204, or a variable or changing sealing effect, based on energization of the sealing element. In this way, the fluid flow acting on the primary sealing element 206 may facilitate the primary sealing element 206 sealing the interface 204 and may facilitate the primary sealing element 206 exhibiting an increased contact force at the first surface 201 and/or second surface 202.

In some cases, the primary sealing element 206 may activate to the energized state over an engagement period. For example, the primary sealing element 206 may delay at least somewhat in energizing and sealing the interface 204 based on a period of time it takes to energize the primary sealing element 206 from the initial state to the energized state. In some cases, the fluid 208 may be (e.g., initially) introduced in the interface 204 at pressures and/or flow rates that are insufficient to energize the primary sealing element 206. In some cases, the fluid 208 may be ramped up to a pressure and/or flow rate that is sufficient to energize the primary sealing element 206 and sufficiently seal the interface 204. However, given the need for energizing the primary sealing element 206, in some cases some of the fluid 208 may flow past the primary sealing element 206. For example, the fluid 208 may flow past the primary sealing element 206 when the fluid 208 is flowed at lower pressures and/or flow rates, and/or before the fluid 208 is ramped up to a sufficient pressure and/or flow rate so as to energize the primary sealing element 206 sufficiently to seal the interface 204.

Accordingly, in some cases, the sealing device 200 may allow at least some fluid 208 to blow by, leak, or flow past the sealing device 200 and to continue through the interface 204 (e.g., at least initially). This may be undesirable in that leaking fluid may damage components intended to be sealed off from the fluid 208, may compromise the functionality of a downhole tool implementing the sealing device 200, and/or may ineffectively direct the flow of the fluid 208, among other consequences.

In some cases, the fluid 208 escaping past the primary sealing element 206 in this way may prevent the primary sealing element 206 from energizing and sealing the interface 204 at all. For example, should the fluid 208 flow past the primary sealing element 206 such that the fluid 208 is present on either side of the primary sealing element 206 at pressures and/or flow rates that are substantially close or similar, it may be the case that the primary sealing element 206 fails to sufficiently energize and/or seal at all, leading to total or catastrophic failure of the sealing device 200.

The discussion of the sealing device 200 thus far may be applicable to the sealing of the interface 204 from the flow of liquid fluids. In some cases, it may be desirable to seal the interface 204 from the flow of gasses. For example, the fluid 208 may be a gas. In some cases, the primary sealing element 206 may be especially prone to leakage or other failures when implemented for sealing gases. For example, as described herein, the primary sealing element 206 may be energized based on the flow of the fluid 208 deforming, deflecting, wedging, or otherwise increasing the contact pressure of the primary sealing element 206 against the surfaces of the interface 204. The fluid 208 may act to energize the primary sealing element 206 in this way based on the fluid 208 having a sufficient mass flow rate acting against the primary sealing element 206. The fluid 208 being implemented as a gas, however, may have a substantially lower mass (e.g., than a liquid fluid) and as such may not act on the primary sealing element 206 with sufficient force to cause the primary sealing element 206 to energize and seal. Accordingly, the primary sealing element 206 may fail to adequately seal the interface 204 from the flow of fluid 208 when implemented as a gas. Thus, the sealing device 200 may present challenges when implemented in an environment for sealing gaseous fluids.

FIGS. 3-1, 3-2, and 3-3 illustrate side cross-section views of a sealing device 300, according to at least one embodiment of the present disclosure. The sealing device 300 may be similar to and may include any of the features of the sealing device 200 as described herein in connection with FIGS. 2-1 to 2-3. For instance, the sealing device 300 may be implemented to seal an interface 304 between a first surface 301 and a second surface 302. The sealing device 300 may be positioned in a pocket 314 for positioning the sealing device 300 between the first surface 301 and second surface 302. The sealing device 300 may include one or more primary sealing elements 306 for forming a primary seal 320 at the interface 304. The sealing device 300 may include a carrier body 310. The carrier body 310 may facilitate positioning and maintaining the primary sealing element 306 in the pocket 314 and/or separating several primary sealing elements 306 of the sealing device 300 as described herein. For example, the carrier body 310 may include a sealing profile 312 for engaging with the primary sealing element 306 in order to maintain and/or preserve a shape or form of the primary sealing element 306. The sealing device 300 may be implemented to form a fluid and pressure seal at the interface 304 for sealing or preventing the flow of a fluid 308 through the interface 304.

Figure 31:
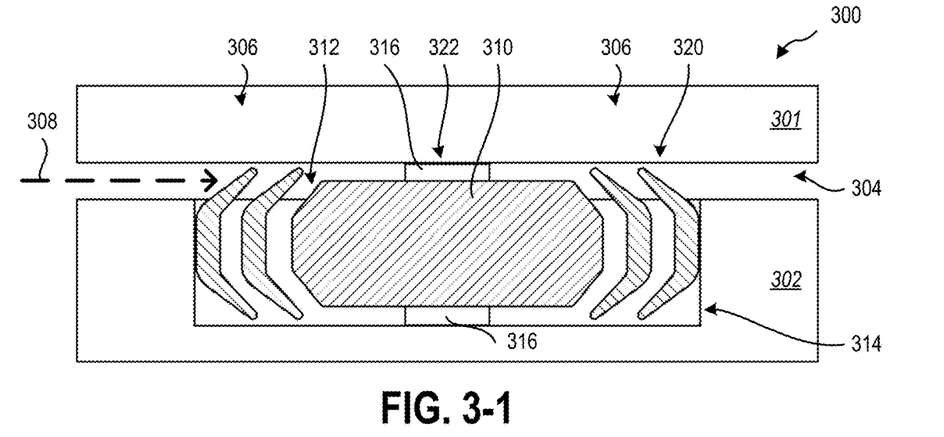
Figure 32:
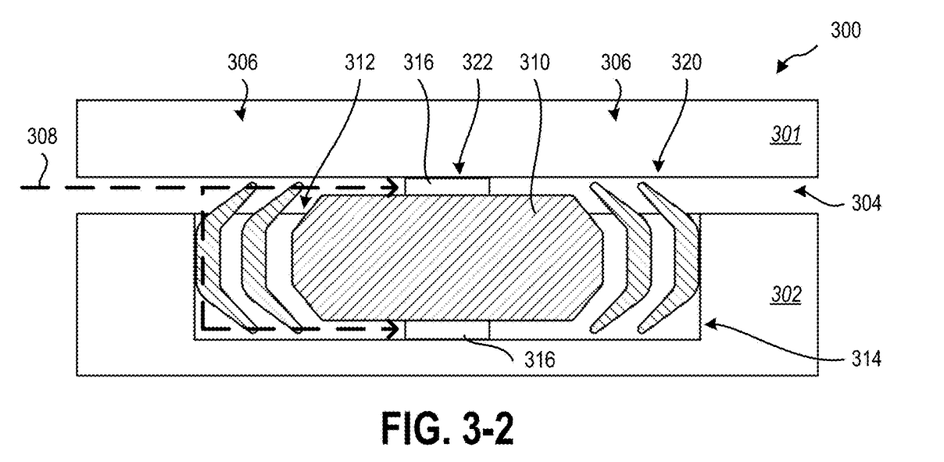
Figure 33:
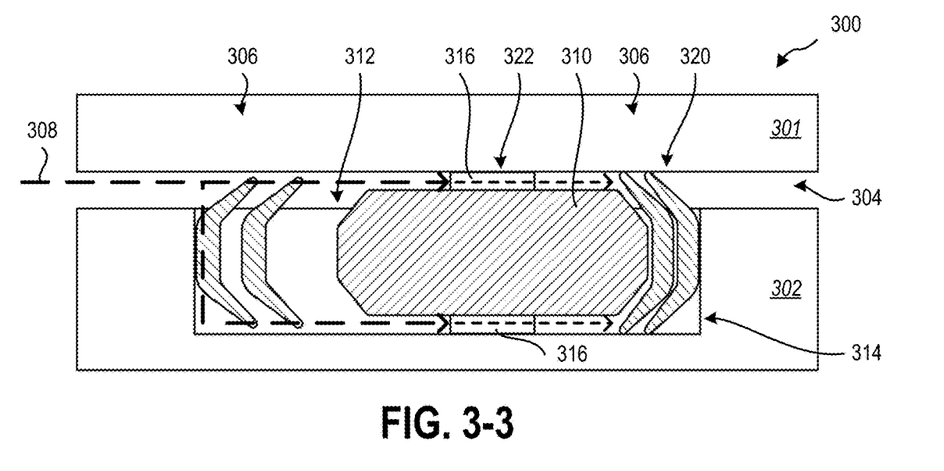

The sealing device 300 may include one or more additional features and/or modifications to features of the sealing device 200 as described above. For instance, the sealing device 300 includes a means for forming a secondary seal 322. For example, the secondary seal 322 may be formed via one or more carrier sealing elements 316. For example, the sealing device 300 may include one carrier sealing element 316. In some cases, the sealing device 300 includes two or more carrier sealing elements 316. For example, the sealing device 300 may include one or more carrier sealing elements 316 on a top surface of the carrier body 310 (e.g., as oriented in this illustrative example) oriented toward the first surface 301, and may include one or more carrier sealing elements 316 on a bottom surface of the carrier body 310 (e.g., as oriented in this illustrative example) oriented toward the second surface 302 (e.g., within the pocket 314). In some embodiments, the carrier body 310 may be a carrier ring, with the top of the carrier body 310 may be an outer diameter (OD) of the carrier body 310 and the bottom of the carrier body 310 may be an inner diameter (ID) of the carrier body 310, or vice versa. The sealing device 300 may include any number of carrier sealing elements 316 on the top and or bottom of the carrier body 310.

The carrier sealing elements 316 may be any type of sealing element positioned, disposed, or otherwise included on the carrier body 310. For example, as described herein in detail, the carrier sealing elements 316 may be separate elements that may be assembled or positioned on the carrier body 310 such as in a seal groove of the carrier body 310, or may be sealing elements that are integrally formed with or on the carrier body 310. The carrier sealing elements 316 may be representative of mating sealing (e.g., polished) surfaces of the sealing device 300 for engaging with the first surface 301 and second surface 302, for example, without a separate or dedicated sealing element. In some cases, the carrier sealing elements 316 are O-ring seals. The carrier sealing elements 316 may all be the same type of sealing element and/or may be different sealing elements.

The carrier sealing elements 316 may form a secondary seal 322 for sealing the interface 304. For example, the carrier sealing elements 316 may engage and/or contact the first surface 301 and the second surface 302 for sealing the interface 304 and for preventing the fluid 308 from flowing past the sealing device 300. The carrier sealing elements 316 may be a type of sealing element that may provide an effective seal without requiring energization and/or activation in the way that the primary sealing element may require energization. For example, upon assembly of the sealing device 300 and/or placement of the sealing device 300 within the interface 304 and between the surfaces, the carrier sealing elements 316 may exhibit sufficient contact pressure to substantially seal the interface 304 from the flow of the fluid 308. In some cases, this initial contact pressure is enough to energize and/or activate the carrier sealing elements 316, for example, on their own. For instance, the carrier sealing elements 316 may be made of a material that is softer and/or more deformable than the primary sealing elements 206. For instance, the carrier sealing elements 316 may be made of rubber, silicone, elastomer, polymer or any other suitable materials. In some cases, the carrier sealing elements 316 may be O-ring seals, molded seals, quad seals, T seals, or similar-type sealing elements that may deform and/or may be subject to compressive forces between the first surface 301 and second surface 302 to seal the interface 304.

In this way, as shown in FIG. 3-2, the sealing device 300 may provide a fluid seal at the interface 304 for preventing the flow of the fluid 308. The sealing device 300 may provide the secondary seal 322 for sealing the interface 304 at fluid pressures and/or flow rates of the fluid 308 that may otherwise be insufficient to energize the primary sealing element 306 and/or that would otherwise result in the fluid 308 leaking or flowing past the primary sealing element 306, as described herein.

For example, as shown in FIG. 3-2, the fluid 308, may flow through the interface 304. Instead of flowing past the carrier body 310 and engaging or contacting the primary sealing element 306 as described above, the carrier sealing elements 316 may seal the interface 304 at the carrier body 310 and the fluid 308 may contact or engage the carrier sealing elements 316. In this way, as described herein, the fluid 308 may not be permitted to flow to, and past the primary sealing elements 306 before the primary sealing element 306 have become sufficiently energized (e.g., at lower pressures and/or flow rates). In this way, the sealing device 300 may provide the secondary seal 322 in order to facilitate a more effective and reliable sealing of the interface 304 at a variety of different pressures and flow rates.

The carrier sealing elements 316 forming the secondary seal 322 of the interface 304 in this way may also facilitate energizing the primary sealing elements 306. For example, the fluid pressure of the fluid 308 acting on the carrier sealing elements 316 may exert a force on the carrier sealing elements 316 and therefore on the carrier body 310. This force may cause the carrier body 310 to slide laterally (e.g., to the right in this example) and engage the primary sealing element 306 with the sealing profile 312, as shown in FIG. 3-3. The carrier body 310 may accordingly transmit force to the primary sealing element 306. The engagement of the carrier body 310 with the primary sealing element 306 may cause the primary sealing element 306 to energize or activate to the energized state of the primary sealing element 306 as described herein. For example, the sealing profile 312 may have a shape or form that may cause the primary sealing element 306 to deform, deflect, wedge into, or otherwise engage the first surface 301 and/or the second surface 302 with an increased surface force, in a similar way to the fluid 308 acting to energize the primary sealing element 306.

In this way, the sealing device 300 may energize the primary sealing element 306 to form the primary seal at the interface 304 by virtue of the carrier body 310 engaging with the primary sealing element 306 rather than the fluid 308 acting directly on the primary sealing element 306. In this manner, the sealing device 300 may not be susceptible to leakage of the fluid 308 past the primary sealing element 306. For example, because the carrier sealing elements 316 form the secondary seal 322 at the interface 304, the carrier sealing elements 316 may prevent the fluid 308 from flowing to, and engaging with (at least initially), the primary sealing element 306 before they may become energized and form the primary seal as described herein. Thus, the sealing device 300 may operate to provide an adequate seal of the interface 304, for example, at pressures and/or flow rates of the fluid 308 that would otherwise be insufficient to energize the primary sealing element 306 and that may otherwise result in leaking of the primary sealing element 306 or even failure of the primary sealing element 306 to seal. In some cases, the sealing device 300 may operate in this way in either direction (e.g., left or right in this example) based on a flow of the fluid 308 in either direction through the interface 304.

In this way, the sealing device 300 providing both the primary seal 320 and the secondary seal 322 of the interface 304 may be advantageous. For example, the sealing device 300 may be implemented to effectively provide a fluid and pressure seal at the interface 304 for pressures of up to 10,000 psi without exhibiting leakage or blow by of the fluid 308. In another example, forming both the primary seal 320 and the secondary seal 322 may provide beneficial redundancy for sealing the flow of the fluid 308. For instance, in some cases, the primary sealing element 306 may be more susceptible to compression set after extended and/or repeated thermal and/or pressure cycling, while the carrier sealing element 316 may suffer less from compression set under these circumstances. Thus, by providing redundant primary and secondary seals, the sealing device 300 may be reliably implemented for extended tool life.

In another example, the primary sealing element 306 and carrier sealing element 316 may be made of different materials that may be advantageously suitable for operating at different temperature ranges. As an illustrative example, one sealing element may be made of a first material, such as a perfluoro-elastomer, that can operate at temperatures up to a first temperature threshold, such as up to 350° F. The other sealing element may be made of a second material, such as a fluoro-elastomer which may be better suited for operating at temperatures up to a second, higher temperature threshold, such as up to 450° F. While the second material may perform better at elevated temperatures, the first material may perform better than the second material at lower temperatures, such as at room temperature. Thus, the sealing device 300 may include the primary sealing element 306 and the carrier sealing element 316 made of different materials in order to leverage the benefits of both materials.

In some cases, the primary sealing element 306 may be a sealing element that is stronger, more robust, more reliable (e.g., once energized) and/or better equipped to handle higher pressures and/or flow rates of the fluid 308. For example, the carrier sealing element 316 may be better equipped to handle (e.g., initially) lower pressures and/or flow rates of the fluid 308 as described herein, and the primary sealing element 306 may be better equipped to handle flow rates and/or pressure to elevated degrees. In this way, the sealing device 300 may be a two-stage device for providing fluid seals for different operating conditions. For instance, in some cases, the fluid 308 may be introduced within the interface 304 at pressures and/or flow rates that may exceed the capabilities of the carrier sealing elements 316 to seal the interface 304. Accordingly, in some cases, the fluid may, at least somewhat, flow past the carrier sealing elements 316, such as the dotted flow of the fluid 308 shown in FIG. 3-3. In such cases, the primary sealing elements 306 may provide the primary seal 320 of the interface 304 to sufficiently seal the interface 304 and to prevent any flow of the fluid 308 past the sealing device 300 at these elevated pressures and/or flow rates.

The sealing device 300 may also be equipped to effectively and reliably seal the interface 304 from the flow of gasses through the interface 304. For instance, in some cases the fluid 308 may be a gas, for example, rather than a liquid. As described above, gaseous fluids may exhibit lower mass flow rates which may tend to present challenges with sufficiently energizing the primary sealing element 306 directly for sealing the interface 304. As described herein, the carrier sealing elements 316 may initially exhibit sufficient contact pressure so as to seal the interface 304 (e.g., without being energized or by self-energizing). In this way, given the flow of the fluid 308 in a gaseous state, the carrier sealing elements 316 may operate to seal a gaseous flow of the fluid 308. As described herein, the fluid 308 engaging with the carrier sealing elements 316 may exert a force on the carrier body 310, which may engage with and energize the primary sealing element 306 to form the primary seal 320 at the interface 304. Accordingly, the sealing device 300 may operate to provide the primary seal 320 with the primary sealing elements 306 in the presence of gasses to seal the interface 304 from the flow of gasses.

FIG. 4-1 illustrates a side cross-section view of a sealing device 400, according to at least one embodiment of the present disclosure. The sealing device 400 may be substantially similar to the sealing device 300 as described herein in connection with FIGS. 3-1 to 3-3.

Figure 41:
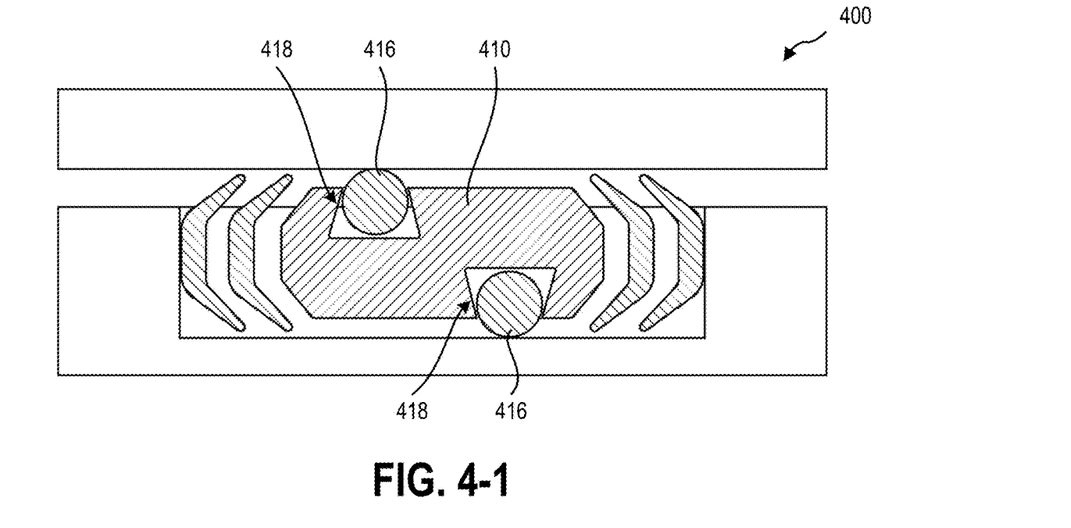

In some embodiments, a carrier body 410 of the sealing device 400 may be implemented with two carrier sealing elements 416. The carrier sealing elements 416 may be disposed on the carrier body 410. For example, the carrier body 410 may include seal grooves 418 formed in the carrier body 410 for retaining the carrier sealing elements 416. For instance, the carrier sealing elements 416 may be positioned within the seal grooves 418 and may extend or protrude at least somewhat from the seal grooves 418. In some embodiments, the carrier sealing elements 416 may be separately formed sealing elements, such as O-ring seals, that are disposed on the carrier body 410 in the seal grooves 418. For instance, the seal grooves 418 may have a cross section that is complementary to the shape of the carrier sealing elements 416. The seal grooves 418 may have a cross section that is round, square, rectangular, triangular, polygonal, a non-uniform shape, or any other cross section. In some embodiments, the seal grooves 418 have a dovetail cross section. For instance, an opening of the seal grooves 418 may be narrower than a base of the seal grooves 418. The opening of the seal grooves 418 may be narrower than a width or diameter of the (cross section of the) carrier sealing elements 416. In this way, it may require some amount of force to insert or position the carrier sealing elements 416 in the seal grooves 418, which may facilitate maintaining a position of the carrier sealing elements 416 and retaining the carrier sealing elements 416 in the carrier body 410.

Figure 42:
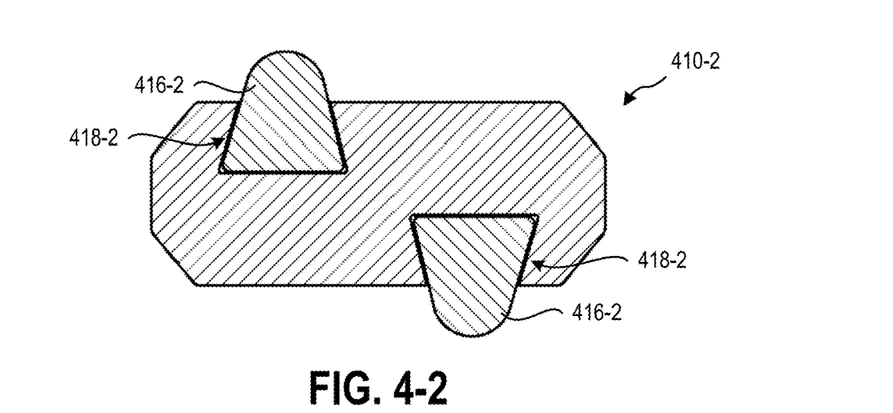

FIG. 4-2 illustrates a side cross-section view of a carrier body 410-2, according to at least one embodiment of the present disclosure. One or more carrier sealing elements 416-2 may be disposed on the carrier body 410-2 in seal grooves 418-2, as described herein.

In some embodiments, the seal grooves 418-2 and carrier sealing elements 416-2 may be formed having complementary cross sections such that the carrier sealing elements 416-2 match closely and/or fit snugly within the seal grooves 418-2. For instance, the carrier sealing elements 416-2 may have a same cross-section as the seal grooves 418-2. In some embodiments, the carrier sealing elements 416-2 may be integrally formed with the carrier body 410-2, or the carrier sealing elements 416-2 may be separately formed and assembled with the carrier body 410-2.

Figure 43:
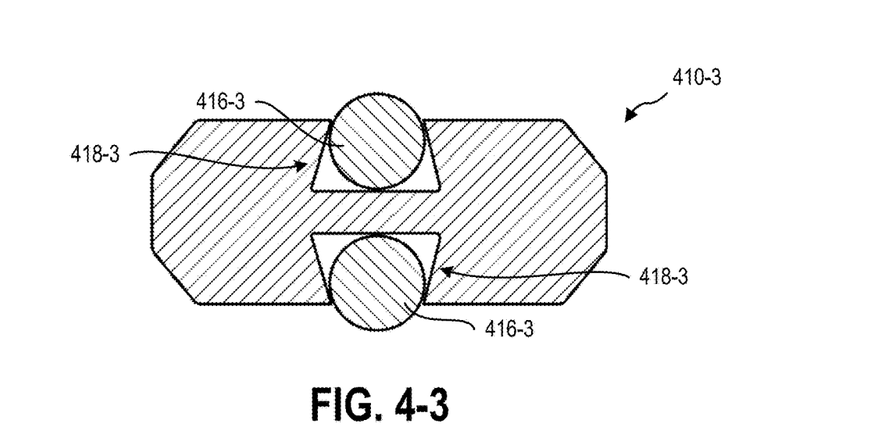

FIG. 4-3 illustrates a side cross-section view of a carrier body 410-3, according to at least one embodiment of the present disclosure. One or more carrier sealing elements 416-3 may be disposed on the carrier body 410-3 in seal grooves 418-3, as described herein.

In some embodiments, the seal grooves 418-3 are offset, such as that shown and described with respect to some of the carrier bodies described herein. For instance, seal grooves may be positioned at different lateral positions on a carrier body, for example, such as in a diagonal orientation. In some embodiments, the seal grooves 418-3 may be partly or wholly aligned, such as that shown in FIG. 4-3. For example, the seal grooves 418-3 may be positioned at a same lateral position on the carrier body 410-3. In implementations where the carrier body 410-3 is round, such as a carrier ring, the seal grooves 418-3 may be concentric, such as seal grooves 418-3 being positioned on an ID and OD of the carrier body 410-3 at a same lateral position on the carrier body 410-3.

The positioning of the seal grooves may be based on a size, form, and/or thickness of the carrier body. For example, the thickness of the carrier body may dictate whether the seal grooves may be positioned in an aligned or offset configurations. For instance, in thinner configurations of the carrier body, it may be necessary to offset the seal grooves in order to maintain a minimum material thickness between the seal grooves to maintain a structural strength and/or rigidity of the carrier body. In some embodiments, thicker configurations of the carrier body may accommodate implementing the seal grooves in an aligned configuration based on the thickness of the carrier body allowing for more material thickness between the seal grooves. The aligned configuration may provide for more material thickness between the seal grooves and the sealing profile of the carrier body to maintain a structural strength and/or rigidity of the carrier body.

Figure 51:
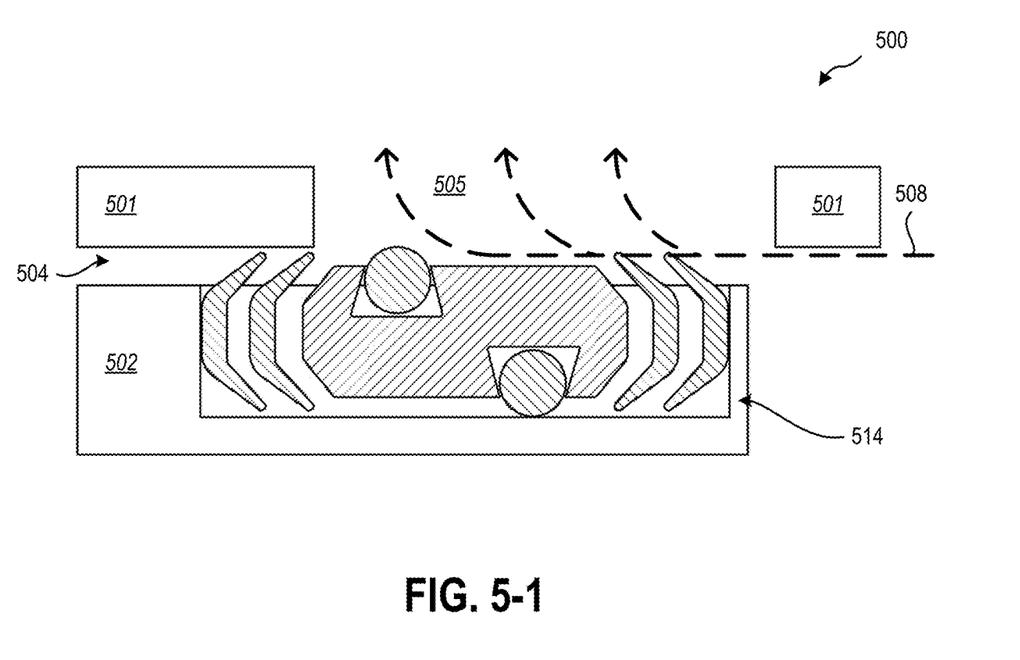
Figure 52:
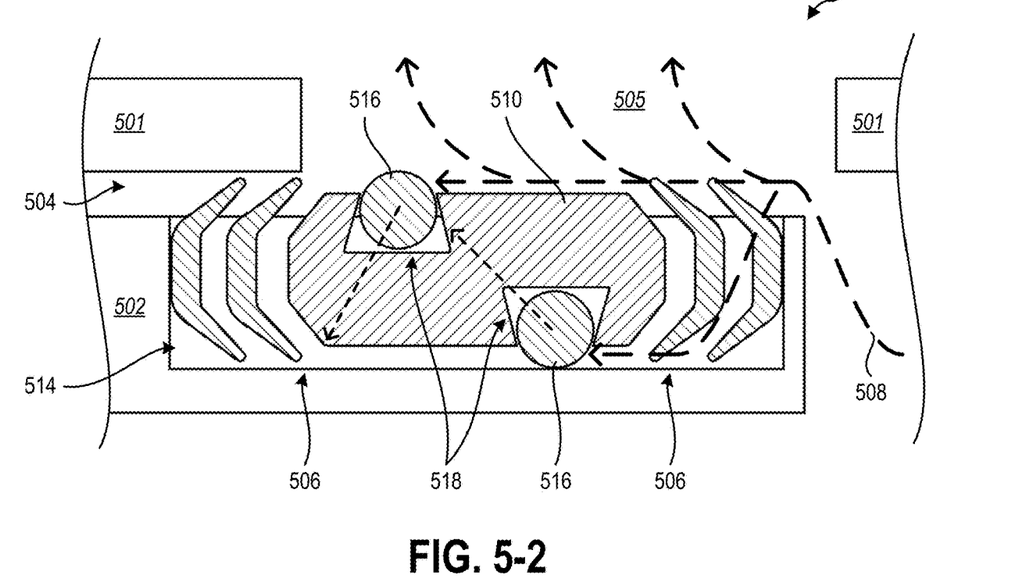

FIGS. 5-1 and 5-2 illustrate a side cross-section view of a sealing device 500, according to at least one embodiment of the present disclosure. The sealing device 500 may be substantially similar to the sealing devices described herein.

The sealing device 500 may be implemented between a first surface 501 and a second surface 502 to seal an interface 504 therebetween. In some cases, the sealing device 500 may be subject or exposed to an open interface 505. For example, the first surface 501 and/or the second surface 502 may slide, rotate, or otherwise move, which may position the sealing device 500 at, or exposed to, the open interface 505. For instance, the sealing device 500 may be positioned on a mandrel of a spool valve, and the mandrel may slide to expose the sealing device 500 to the open interface 505. In another example, the sealing device 500 may be positioned on a sleeve of a valve, which may slide or rotate to expose the open interface 505 to the sealing device 500. The sealing device 500 may be exposed to the open interface 505 through any other mechanism or means. The sealing device 500 may be configured to transition one or more times between the interface 504 and the open interface 505 (and/or multiple different open interfaces). For instance, the sealing device 500 may be operable to transition in and out of the open interface 505 in one or more directions and at one or more sides of the open interface 505. The sealing device 500 may be operable to return to the interface 504 and establish a seal of the interface 504 as described herein.

The open interface 505 may be a port, hole, or other opening in the first surface 501 and/or second surface 502. For instance, the open interface 505 may be a flow port of a valve, such as a spool valve, in which the sealing device 500 is implemented. As described herein, a fluid 508 may be introduced in the interface 504, and the sealing device may be implemented to seal the interface 504 and prevent the flow of the fluid 508. In some embodiments, the fluid 508 may flow through the open interface 505. For example, the first surface 501 and/or second surface 502 may be slid and/or rotated to expose or open the open interface 505, such as within a valve, in order to permit the flow of the fluid through the open interface 505. For instance, as shown in FIG. 5, the fluid 508 may flow out of the open interface 505 and away from the second surface 502. In other examples, the fluid 508 may flow into the open interface 505 and toward the second surface 502.

In some cases, the fluid 508 flowing through the open interface 505 may act on the sealing device 500 and may tend to extract, remove, rip out, or otherwise extricate one or more components of the sealing device 500. For instance, because the sealing device 500, at the open interface 505, is not positioned entirely between the first surface 501 and the second surface 502 and because the sealing device 500 is not retained in place in the interface 504 by these two surface, the flow of the fluid 508 may have a tendency to act on one or more components of the sealing device 500 in a direction that may work to extricate these components from the sealing device 500 and/or from the pocket 514 through the open interface 505.

Figure 53:
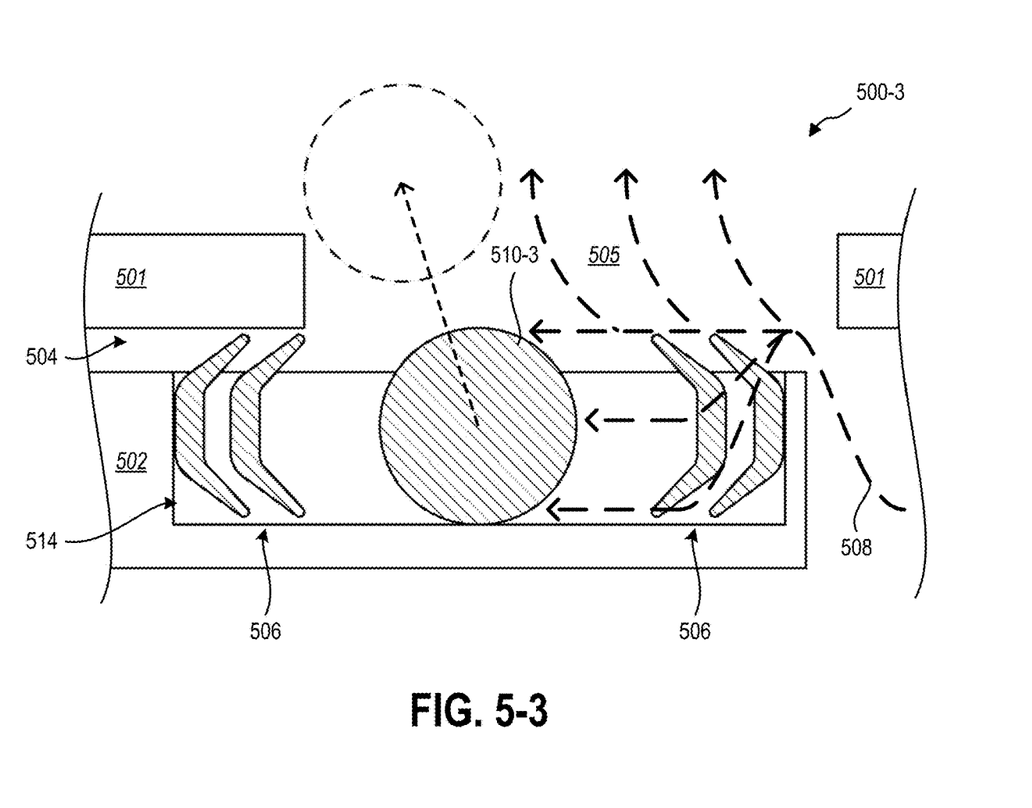

FIG. 5-3 illustrates a side cross-section view of an example sealing device 500-3, according to at least one embodiment of the present disclosure. The sealing device 500-3 includes a sealing body 510-3, which may be a unitary body comprising the form and/or functionality of both the carrier bodies and the carrier sealing elements as described herein. For example, the sealing body 510-3 may be a (e.g., large) O-ring seal that may be implemented to take the place of both the carrier body and the carrier sealing elements. For instance, the sealing body 510-3 may function to form a secondary seal between the first surface 501 and second surface 502, may operate to engage and energize the primary sealing elements 506, etc.

In some embodiments, the sealing body 510-3 may be susceptible to extrication by the fluid 508 when exposed to the open interface 505. For example, when the sealing device 500-3 is exposed to the fluid 508 (in either the interface 504 or the open interface 505), the fluid 508 acts on the sealing device 500-3. For instance, the pressure and/or flow rate of the fluid 508 may be present within the pocket 514 and may act on the sealing body 510-3 as the sealing body 510-3 works to seal the interface 504. The fluid 508 may act on the sealing body 510-3 at one or more locations of the sealing body 510-3, including on a bottom of the sealing body 510-3 (as oriented in this example). When exposed to the open interface 505 and because the sealing body 510-3 is not positioned between the first surface 501 and the second surface 502 to maintain the sealing body 510-3 in place, the sealing body 510-3 may be extricated or blown out of the sealing device 500-3 by the fluid 508, for example, through the open interface 505, as shown in FIG. 5-3 in phantom. For instance, the sealing body 510-3 may be made of a soft, deformable material, such as a rubber or polymer suitable for forming the secondary seal as described herein. Such a material of the sealing body 510-3 may not exhibit sufficient material strength and/or rigidity to maintain the sealing body 510-3 in place and/or to prevent the sealing body 510-3 from being ripped or damaged such that the sealing body 510-3 may tend to be removed by the fluid 508 through the open interface 505.

In contrast, the sealing device 500 as shown and described in connection with FIGS. 5-1 and 5-2 may be configured to be exposed to the open interface 505 without suffering damage or extrication of one or more components. For example, the carrier sealing elements 516 being positioned on the carrier body 510 may prevent the carrier sealing elements 516 from being damaged and/or carried away by the fluid 508. For instance, as mentioned, the fluid 508 may penetrate and/or act on the sealing device 500 at many locations of the sealing device 500. To elaborate, in some cases, the fluid 508 may act on a bottom of the sealing device 500 where a bottom carrier sealing element 516 may seal against the second surface 502 (e.g., within the pocket 514). The fluid 508 acting on the bottom of the sealing device 500 in this way, however, may not cause the bottom carrier sealing element 516 to become ripped out of the sealing device 500 through the open interface 505. For example, because the carrier sealing elements 516 are positioned on the carrier body 510 (e.g., in the seal grooves 518), the fluid 508 may act to press the carrier sealing elements 516 further into the carrier body 510 and/or further into the seal grooves 518. Thus, the carrier sealing elements 516 may be prevented from becoming damaged and/or extricated through the open interface 505 notwithstanding the carrier sealing elements 516 being made of a soft, more deformable, and/or weaker material. For example, the carrier body 510 may be constructed of a rigid and/or strong material such as a metal, polymer, composite, or other material that has sufficient structural strength and/or rigidity to withstand the fluid pressures acting on the sealing device 500 outward toward the open interface 505. In a similar way, the fluid 508 may act on the upper sealing element 516, which may tend to force the upper sealing element 516 downward into the carrier body 510, maintaining the upper sealing element 516 in place.

The retaining functionality of the carrier sealing elements 516 by the carrier body 510 in this way may further be facilitated by the shape and/or form of the seal grooves 518. For instance, the carrier grooves may be dovetailed, and a certain amount of insertion force may be needed to insert the carrier sealing elements 516 into the seal grooves 518, providing further protection against removal of the carrier sealing elements 516 by the fluid 508. In other embodiments, the carrier sealing elements 516 and the seal grooves 518 may be formed and/or shaped in other similar and/or complementary ways such that the carrier sealing elements 516 fit snugly in the seal grooves 518 in order to prevent removal of the carrier sealing elements 516 by the fluid 508.

FIGS. 6-1, 6-2, and 6-3 illustrates side cross-section views of a sealing device 600, according to at least one embodiment of the present disclosure. The sealing device 600 may be substantially similar to and may include any of the features of the sealing device 300 as described herein in connection with FIGS. 3-1, 3-2, and 3-3. The sealing device 600 may include one or more primary sealing elements 606 for forming a primary seal 620 at an interface 604 between a first surface 601 and a second surface 602. One or more carrier sealing elements 616 may be positioned on the carrier body 610 and may form a secondary seal 622 for sealing an interface 604 and for energizing the primary sealing elements 606 as described herein.

Figure 61:
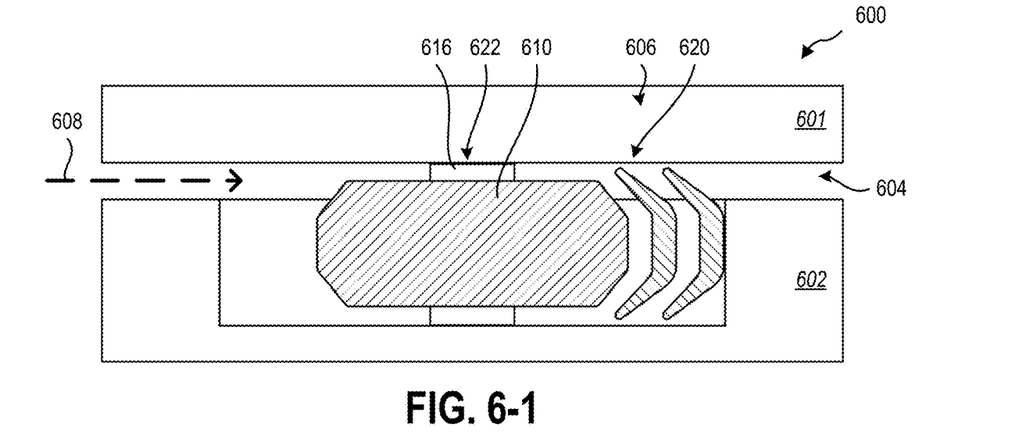
Figure 62:
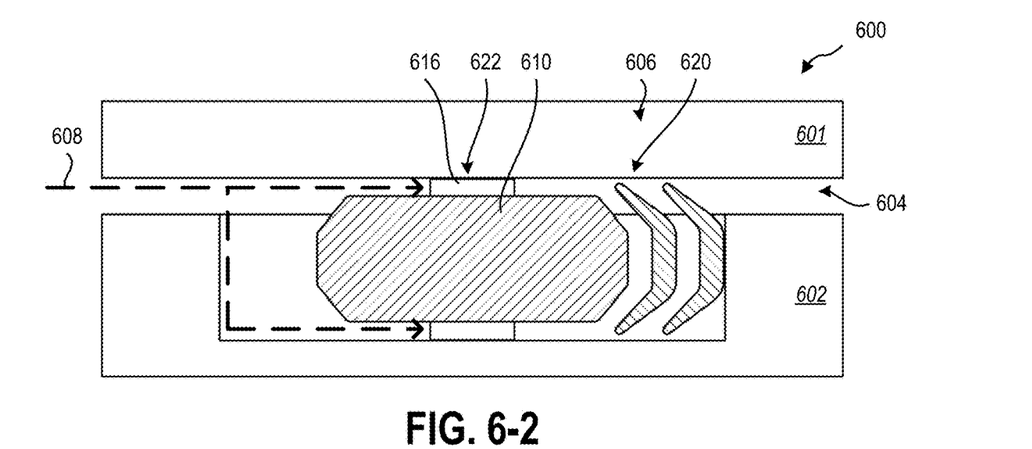
Figure 63:
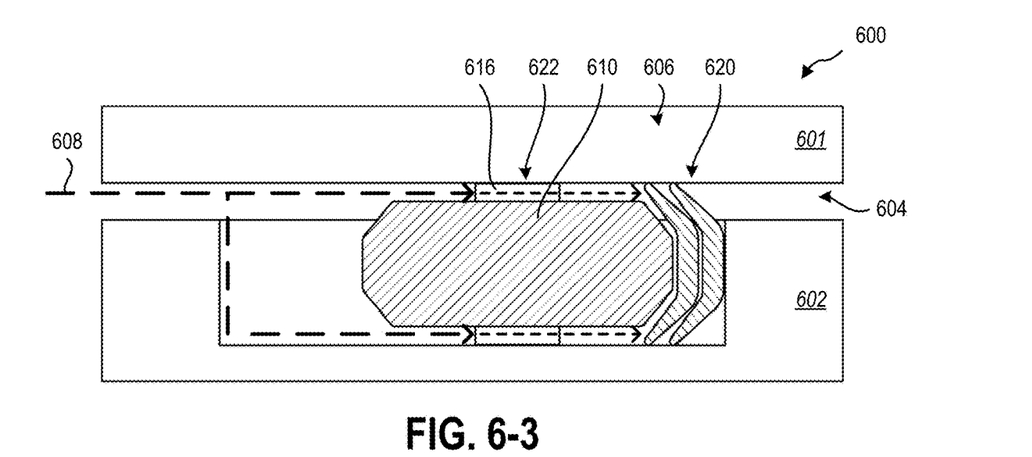

In some embodiments, the primary sealing elements 606 may be positioned on one side of a carrier body 610. For example, the sealing device 600 may be a unidirectional sealing device for providing a fluid and/or pressure seal in a first direction (e.g., to the right as shown in this example). The sealing device 600 may allow or may not seal a fluid flow 608 in a second, opposite direction (e.g., to the left). In this way, the techniques described herein may be implemented in a variety of different situations for providing reliable fluid and/or pressure seals for many different applications.

INDUSTRIAL APPLICABILITY

The following description includes various embodiments that, where feasible, may be combined in any permutation. For example, the embodiment provided in the next paragraph may be combined with any or all embodiments of the paragraphs that follow. Embodiments that describe acts of a method may be combined with embodiments that describe, for example, systems and/or devices. Any permutation of the following paragraphs is considered to be hereby disclosed for the purposes of providing "unambiguously derivable support" for any claim amendment based on the following paragraphs. Furthermore, the following paragraphs provide support such that any combination of the following paragraphs would not create an "intermediate generalization."

In some embodiments, a sealing device for sealing an interface between a first surface and a second surface includes a primary sealing element for forming a primary seal at the interface, a carrier body that is slidable with respect to the interface to engage the primary sealing element, a carrier sealing element positioned on the carrier body, wherein the carrier sealing element is configured to seal the interface with a secondary seal, and wherein the carrier body is slidable to engaging the primary sealing element based on the secondary seal sealing the interface.

In some embodiments, the primary sealing element is an energizable sealing element between an initial state and an energized state, and wherein a contact pressure of the primary sealing element at the interface is greater in the energized state.

In some embodiments, the primary sealing element is energizable to the energized state at least in part based on the carrier body engaging with the primary sealing element.

In some embodiments, the carrier body includes a sealing profile that is complementary to a shape of the primary sealing element for engaging with the primary sealing element and for retaining the shape of the primary sealing element.

In some embodiments, the primary sealing element is energizable to the energized state based at least in part on the sliding of the carrier body.

In some embodiments, the primary sealing element is a V-ring seal.

In some embodiments, the primary sealing element includes a stack of a plurality of sealing elements.

In some embodiments, the primary sealing element is a first primary sealing element and is positioned on a first side of the carrier body, the sealing device further including a second primary sealing element positioned on a second side of the carrier body, wherein the carrier body is slidable in a first direction to engage with the first primary sealing element to form a first primary seal at the interface, and wherein the carrier body is slidable in a second direction to engage with the second primary sealing element to form a second primary seal at the interface.

In some embodiments, the carrier body is slidable in the first direction and in the second direction based on the secondary seal of the carrier sealing element sealing the interface.

In some embodiments, the first primary sealing element is unidirectional in the first direction for providing a pressure seal of the interface in the first direction, and wherein the second primary sealing element is unidirectional in the second direction for providing a pressure seal of the interface in the second direction.

In some embodiments, the carrier sealing element includes a first carrier sealing element and a second carrier sealing element positioned on opposite surfaces of the carrier body.

In some embodiments, the carrier body includes a seal groove and wherein the carrier sealing element is positioned in the seal groove.

In some embodiments, the carrier sealing element is an O-ring seal.

In some embodiments, a sealing device for sealing a sealing interface between a first surface and a second surface includes a primary sealing element, a carrier body that is slidable with respect to the sealing interface to engage the primary sealing element and to energize the primary sealing element against the sealing interface to form a primary seal, a carrier sealing element positioned on the carrier body, wherein the carrier sealing element is configured to seal the sealing interface with a secondary seal, and wherein the sealing device is configured to transition between the sealing interface and an open interface of the first and second surfaces.

In some embodiments, the transition of the sealing device between the sealing interface and the open interface is based on the first surface sliding with respect to the second surface to expose the sealing device to the open interface.

In some embodiments, the first surface and the second surface respectively are a cylinder and a mandrel of a spool valve, and wherein the open interface is a flow port of the spool valve.

In some embodiments, a downhole valve includes an outer cylindrical body, an inner cylindrical body positioned within the outer cylindrical body with an interface therebetween, and a sealing device for sealing the interface including a V-ring seal stack, a carrier ring that is slidable with respect to the interface to engage the V-ring seal stack and to activate the V-ring seal stack against the interface and form a primary seal, and a carrier sealing element disposed on the carrier ring, wherein the carrier sealing element is configured to seal the interface with a secondary seal, and wherein the carrier ring is slidable based on the secondary seal sealing the interface, wherein the inner cylindrical body is slidable with respect to the outer cylindrical body to expose the sealing device to a flow port for flowing a downhole fluid through the flow port.

In some embodiments, the carrier sealing element is positioned in a seal groove of the carrier ring to retain the carrier sealing element when the sealing device is exposed to the flow port.

In some embodiments, the carrier sealing element includes an inner carrier sealing element disposed at an inner diameter of the carrier ring and an outer carrier sealing element disposed at an outer diameter of the carrier ring.

In some embodiments, the V-ring seal stack includes a first V-ring seal stack positioned on a first side of the carrier ring and a second V-ring seal stack positioned on a second side of the carrier ring, and wherein the carrier ring is slidable in a first direction to engage and activate the first V-ring seal stack and seal the interface in the first direction, and the carrier ring is slidable in a second direction to engage and activate the second V-ring seal stack to seal the interface in the second direction.

The embodiments of the sealing device have been primarily described with reference to wellbore operations. The sealing devices described herein may be used in applications other than within a wellbore. In other embodiments, the sealing devices according to the present disclosure may be used outside a wellbore or other downhole environment used for the exploration or production of natural resources. For instance, the dealing devices of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements. Additionally, as used herein, the term "and/or" includes any and all combinations of one or more of the associated listed items.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A sealing device for sealing an interface between a first surface and a second surface, including:
   a primary sealing element for forming a primary seal at the interface;
   a carrier body that is slidable with respect to the interface to engage the primary sealing element; and
   an inner carrier sealing element and an outer carrier sealing element that are configured to seal the interface with a secondary seal, wherein the inner carrier sealing element is positioned at an inner surface of the carrier body and the outer carrier sealing element is positioned at an outer surface of the carrier body opposite the inner surface, and wherein the carrier body is slidable to engage the primary sealing element based on the secondary seal sealing the interface.

2. The sealing device of claim 1, wherein the primary sealing element is an energizable sealing element between an initial state and an energized state, and wherein a contact pressure of the primary sealing element at the interface is greater in the energized state.

3. The sealing device of claim 2, wherein the primary sealing element is energizable to the energized state at least in part based on the carrier body engaging with the primary sealing element.

4. The sealing device of claim 3, wherein the carrier body includes a sealing profile that is complementary to a shape of the primary sealing element for retaining the shape of the primary sealing element.

5. The sealing device of claim 2, wherein the primary sealing element is energizable to the energized state based at least in part on sliding of the carrier body.

6. The sealing device of claim 1, wherein the primary sealing element is a V-ring seal.

7. The sealing device of claim 1, wherein the primary sealing element includes a stack of a plurality of sealing elements.

8. The sealing device of claim 1, wherein the primary sealing element is a first primary sealing element and is positioned on a first side of the carrier body, the sealing device further including a second primary sealing element positioned on a second side of the carrier body, wherein the carrier body is slidable in a first direction to engage with the first primary sealing element to form a first primary seal at the interface, and wherein the carrier body is slidable in a second direction to engage with the second primary sealing element to form a second primary seal at the interface.

9. The sealing device of claim 8, wherein the carrier body is slidable in the first direction and in the second direction based on the secondary seal sealing the interface.

10. The sealing device of claim 8, wherein the first primary sealing element is unidirectional in the first direction for providing a pressure seal of the interface in the first direction, and wherein the second primary sealing element is unidirectional in the second direction for providing a pressure seal of the interface in the second direction.

11. The sealing device of claim 1, wherein the first surface is cylindrical and the second surface is cylindrical and wherein the inner carrier sealing element is positioned at an inner diameter of the carrier body and the outer carrier sealing element is positioned at an outer diameter the carrier body.

12. The sealing device of claim 1, wherein the inner carrier sealing element is positioned in an inner seal groove of the carrier body and the outer carrier sealing element is positioned in an outer seal groove of the carrier body.

13. The sealing device of claim 1, wherein the inner carrier sealing element and the outer carrier sealing element are each O-ring seals.

14. The sealing device of claim 1,
wherein the carrier body is configured to maintain an inner positioning of the inner carrier sealing element at the inner surface and to maintain an outer positioning of the outer carrier sealing element at the outer surface when the carrier body transitions from the interface between the first surface and the second surface to an open interface of the first surface and the second surface.

15. The sealing device of claim 14, wherein the transition of the sealing device between the interface and the open interface is based on the first surface sliding with respect to the second surface to expose the carrier body to the open interface.

16. The sealing device of claim 14, wherein the first surface and the second surface respectively are a cylinder and a mandrel of a spool valve, and wherein the open interface is a flow port of the spool valve.

17. A downhole valve, comprising:
an outer cylindrical body;
an inner cylindrical body positioned within the outer cylindrical body with an interface therebetween; and
a sealing device for sealing the interface, including:
a V-ring seal stack;
a carrier ring that is slidable with respect to the interface to engage the V-ring seal stack and to activate the V-ring seal stack against the interface and form a primary seal; and
an inner carrier sealing element and an outer carrier sealing element disposed on the carrier ring that are configured to seal the interface with a secondary seal, wherein the inner carrier sealing element is disposed at an inner diameter of the carrier ring and the outer carrier sealing element is disposed at an outer diameter of the carrier ring, and wherein the carrier ring is slidable based on the secondary seal sealing the interface;
wherein the inner cylindrical body is slidable with respect to the outer cylindrical body to expose the carrier ring to a flow port for flowing a downhole fluid through the flow port.

18. The downhole valve of claim 17, wherein the inner carrier sealing element is positioned in an inner seal groove of the carrier ring to retain the inner carrier sealing element when the carrier ring is exposed to the flow port, and wherein the outer carrier sealing element is positioned in an outer seal groove of the carrier ring to retain the outer carrier sealing element when the carrier ring is exposed to the flow port.

19. The downhole valve of claim 17, wherein the V-ring seal stack includes a first V-ring seal stack positioned on a first side of the carrier ring and a second V-ring seal stack positioned on a second side of the carrier ring, and wherein the carrier ring is slidable in a first direction to engage and activate the first V-ring seal stack and seal the interface in the first direction, and the carrier ring is slidable in a second direction to engage and activate the second V-ring seal stack to seal the interface in the second direction.

* * * * *